United States Patent [19]

Wagner

[11] 4,187,581
[45] Feb. 12, 1980

[54] MOLDING DEVICE

[75] Inventor: Richard C. Wagner, Frankfort, Ill.

[73] Assignee: Hollymatic Corporation, Park Forest, Ill.

[21] Appl. No.: 897,292

[22] Filed: Apr. 17, 1978

[51] Int. Cl.² .............................................. A22C 7/00
[52] U.S. Cl. ........................................ 17/32; 425/256
[58] Field of Search ...................... 17/32, 45; 425/239, 425/256

[56] References Cited

U.S. PATENT DOCUMENTS

| | | | |
|---|---|---|---|
| 2,505,540 | 4/1950 | Goldhard | 164/312 X |
| 3,203,037 | 8/1965 | Anhanger et al. | 17/32 |
| 4,118,169 | 10/1978 | Haluska | 17/32 X |
| 4,118,831 | 10/1978 | Holly et al. | 17/32 |

Primary Examiner—Willie G. Abercrombie
Attorney, Agent, or Firm—Wegner, Stellman, McCord, Wiles & Wood

[57] ABSTRACT

A device and method for molding food articles of raw finely divided beef and similar tissue containing food material that is normally subject to uneven shrinkage during cooking comprising supply means for the material, a mold comprising superimposed mold plates each having an opening each with a peripheral edge with the edges of these plate openings being adapted to be aligned to define a mold opening in which the plate openings are of the same size and shape, and a supply passage for supplying pressurized material to the plate openings when the mold is in a mold filling position with the plate opening edges out of alignment. This results in projecting food material across the non-aligned openings to fill the plate openings and there are provided means for moving the plate openings into edge alignment to comprise the mold opening and for removing the resulting shaped article from the mold opening.

12 Claims, 6 Drawing Figures

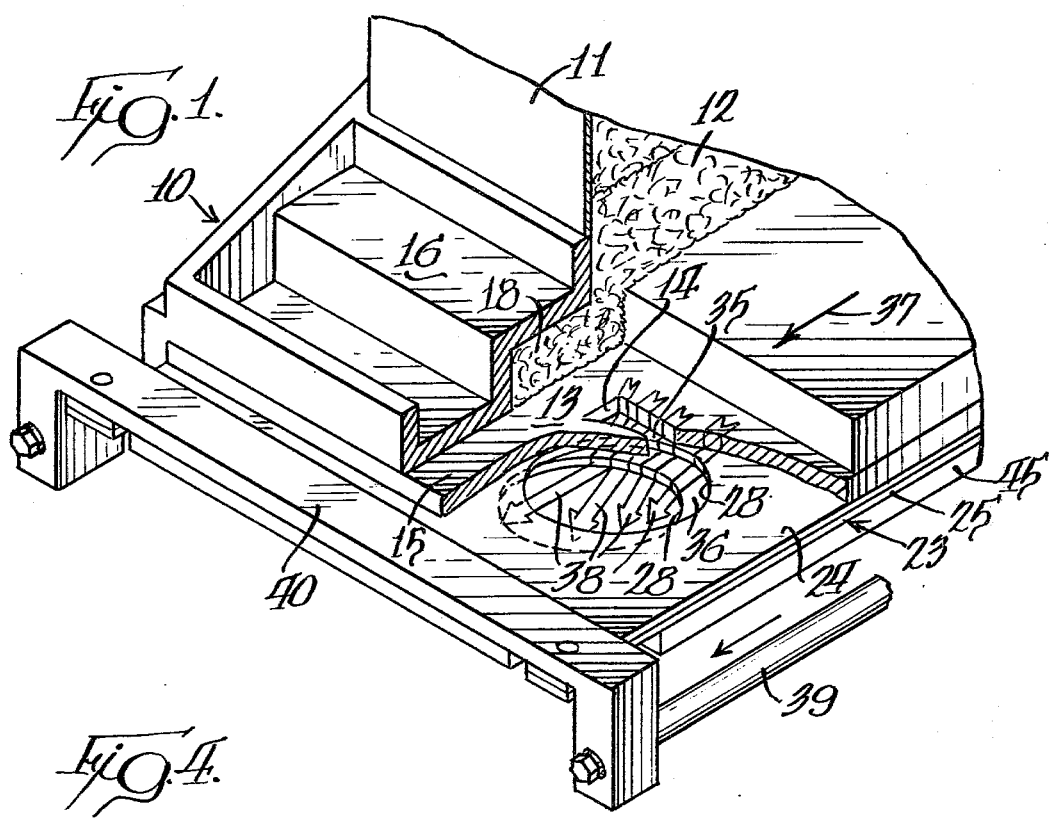
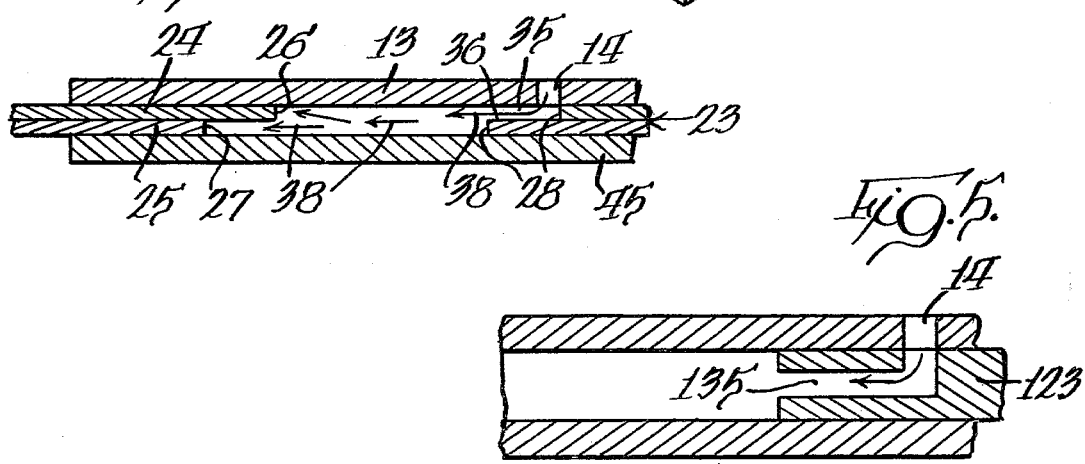
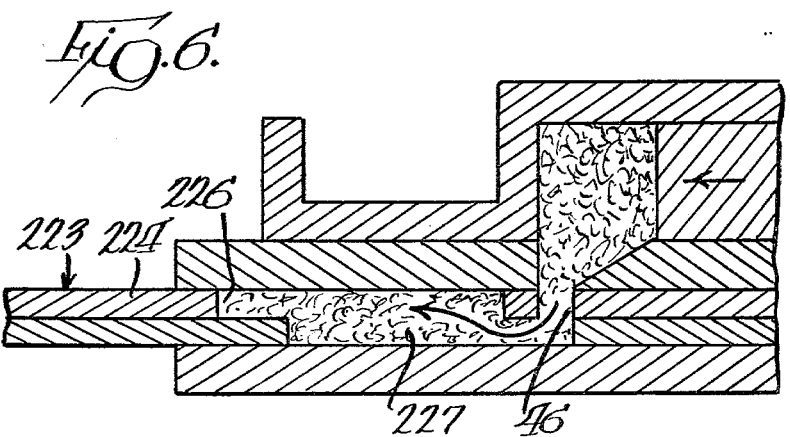

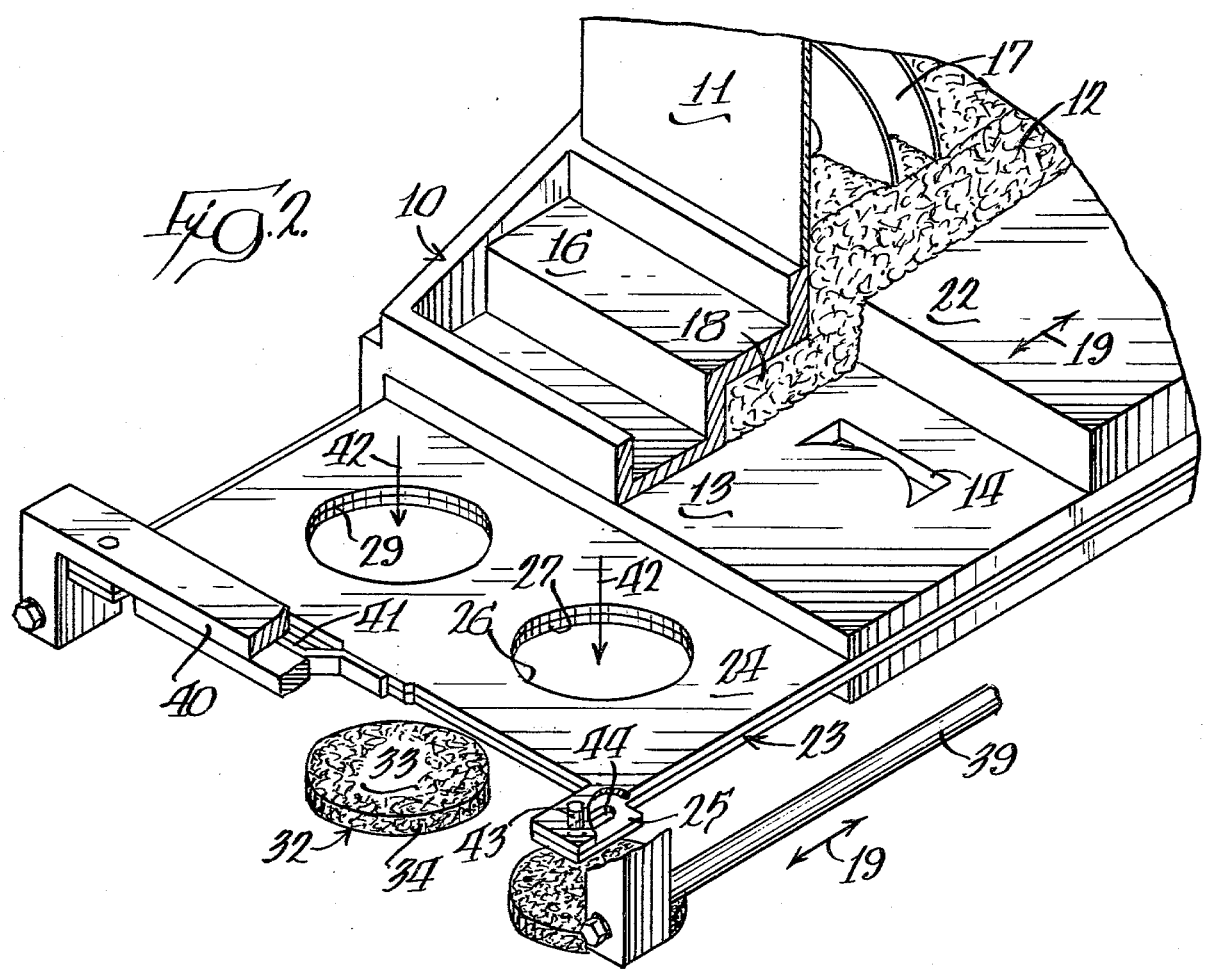
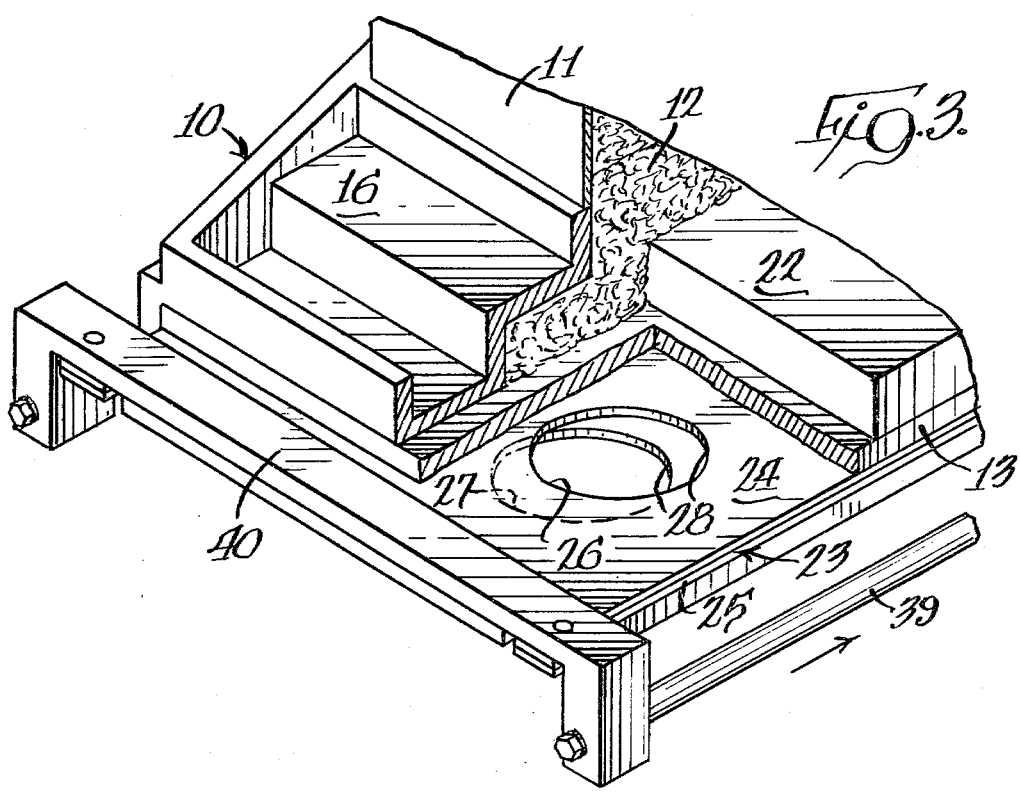

MOLDING DEVICE

CROSS-REFERENCE TO RELATED APPLICATIONS

The molding device of this invention is illustrated in conjunction with a patty machine for making shaped patties of ground raw beef and similar materials of the type disclosed in U.S. Pat. No. 4,153,974.

A molding device adapted to accomplish the purpose of molding articles similar to the results accomplished with this invention is disclosed in U.S. Pat. No. 4,118,831. Both of these applications are assigned to the assignee hereof.

BACKGROUND OF THE INVENTION

This invention relates to a food molding machine particularly for molding flat patties of ground raw beef and similar tissue containing material that tends to cook to a misshaped form. With many of these prior machines the raw patty or shaped article has an attractive appearance but upon cooking becomes misshaped because of the uneven shrinkage of the tissues of the meat and particularly raw beef and, particularly when cooked, the article has an unattractive texture and flavor. The present invention as well as the invention of the above U.S. Pat. No. 4,118,831 avoids these difficulties.

SUMMARY OF THE INVENTION

This invention provides a molding device and method in which pressurized food material is projected into the non-aligned but connected openings in superimposed mold plates comprising a mold until the non-aligned openings are filled with the material after which the plates are moved relative to each other to bring the openings into alignment to comprise the over-all shaping mold opening. The mold is moved to an exterior position with the mold openings and the superimposed plates still in alignment where the shaped article is removed from the mold.

A lost motion connection is provided between the superimposed mold plates so that when in the filling position a plate opening that is adjacent to a supply position is retracted in the out of alignment position thereby providing a flow passage comprising the edge portion of one plate opening and the adjacent surface of the other plate for projecting the food material across the non-aligned openings. The result of this invention is that the food material in the molded article is subjected only to a small amount of frictional drag across the confining surfaces that define the ends of the mold openings. The result is that the shaped articles such as flat patties and particularly those of ground beef are of more uniform thickness within the circumference and therefore cook very rapidly. The patties also tend to be juicier and shrink less.

Thus the shaped patty after removal from the mold opening has the same thickness as the mold opening. In the customary patty device the patties are non-uniform in thickness and therefore tend to cook unevenly.

Patties prepared according to this invention therefore require less meat to produce the same size patty and this patty cooks faster, tastes better and has a better appearance. Expressed another way, the same amount of meat can be used to produce a larger patty than those produced with the presently available machines. Thus the appearance of the patty of this invention is of more meat in the given patty when actually the amount of meat is no greater than customarily used.

BRIEF DESCRIPTION OF THE DRAWINGS

FIG. 1 is a fragmentary perspective view partially broken away of a two patty hamburger molding device with a mold in retracted and mold filling position.

FIG. 2 is a view similar to FIG. 1 but with the mold in extended position illustrating the removal of the patties from the mold.

FIG. 3 is a view similar to FIG. 1 but with a greater amount of structure broken away for further illustration.

FIG. 4 is a vertical sectional view through the two superimposed mold plates and adjacent structure illustrating one embodiment of the invention as shown in the device itself in FIGS. 1–3.

FIG. 5 is a similar view illustrating a second embodiment.

FIG. 6 is a sectional view illustrating a third embodiment.

DESCRIPTION OF THE PREFERRED EMBODIMENTS

The actual device except for the mold and related structure is similar to that disclosed and claimed in the above U.S. Pat. No. 4,153,974.

In this first embodiment the device 10 comprises a hopper 11 for retaining the food material 12, here illustrated as ground raw beef, with the hopper having a bottom fill plate 13 with a pair of fill openings 14 of which only one is shown in FIGS. 1 and 2. This fill plate 13 defines the bottom of the hopper 11 as well as the bottom of a pressure chamber 15. The pressure applying portion of this chamber is defined by an internal heavy wall 16 at the front end of the device.

As is shown in FIG. 2, the food material 12 is moved toward the pressure chamber 15 by a pair of counter-rotating side-by-side augers 17 which are turned in unison in increments as explained in the above U.S. Pat. No. 4,153,974 so as to keep the pressure chamber 15 filled with a material supply 18. Mounted on the top of the fill plate 13 for back and forth motion 19 is a pressure applying ram 22. The ram 22 is adapted to be moved away from or retracted relative to the fill opening 14 preparatory to the next forward pressure stroke toward the opening 14.

Mounted beneath the fill plate 13 is a flat mold 23 comprising superimposed mold plates here shown as two such plates, an upper plate 24 and a lower plate 25. These plates are slidable relative to each other as shown by a comparison between FIGS. 1 and 2 where the upper plate 24 is in retracted position and the plates in FIG. 2 where both are in forwardly extending position.

Each plate 24 and 25 has an opening 26 and 27, respectively, which is circular with each having a peripheral edge 28 that is out of alignment when so retracted but is then movable into alignment as shown in FIG. 2 to define a circular mold opening providing a straight combined edge 29 of generally cylindrical form so that the resulting patty 32 has a flat top surface 33, a similar bottom surface parallel to the top surface 33 and a circular peripheral edge 34 at right angles to these top and bottom surfaces.

When the mold 23 is in retracted mold filling position as shown in FIGS. 1 and 4 the plate edges 28 are out of alignment. This out of alignment relationship provides a flow passage means 35 comprising these edge portions 28 of the plate openings as well as the adjacent exposed plate surface 36 of the other plate which is the forward or bottom plate 25 as shown in FIGS. 1 and 4.

The advancing 37 ram 22 thereupon projects a thin ribbon 38 of the meat into the non-aligned openings as illustrated in FIGS. 1-4. Then, means are provided including the side drive rods 39 and cross bracket 40 for moving the plate openings 26 and 27 first into alignment and then to a position exteriorly of the device 10 or to the position illustrated in FIG. 2.

In order to provide for this relative movement between the two plates there is provided a lost motion pin 43 and slot 44 connection (FIG. 2) between the cross bracket 40 and lower mold plate 25.

The spring 41 is provided to insure the alignment of the openings 26 and 27 when the plates 24 and 25 are moved to their forwardmost positions of FIG. 2 preparatory to patty removal shown schematically in FIG. 2 by arrows 42.

The fill plate 13 comprises a top pressure plate 13. There is also provided a lower pressure plate 45 of usual construction so that the mold 23 reciprocates between the confines of these two parallel pressure plates 13 and 45. In the embodiment of FIG. 5 the mold 123 comprises a solid plate with a flow passage 135 therein leading from the fill opening 14. In the embodiment of FIG. 6 the mold 223 is in two superimposed plates as in the first embodiment, but here the top plate 224 has its mold opening 226 provided with a fill slot 46 that leads first to the rear edge of the lower mold plate opening 27 and from there into the upper opening 226.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. A device for molding food articles of raw finely divided beef and similar tissue containing food material that is normally subject to uneven shrinkage during cooking, comprising: supply means for said material; a mold comprising superimposed mold plates each having an opening each with a peripheral edge with the edges of said plate openings being adapted to be aligned to define a mold opening comprising a said article forming cavity said plate openings being of the same shape and size; a supply passage means for supplying pressurized said material to said plate openings when said mold is in a mold filling position with said plate opening edges out of alignment thereby providing a flow passage means comprising the edge portion of one plate opening and the adjacent surface of the other plate for projecting said food material into the non-aligned openings to fill substantially completely said plate openings with said pressurized material; means for moving said plate openings into edge alignment to comprise said mold opening; and means for moving said aligned plates to an exterior position preparatory to removing the resulting molded food article from said mold opening.

2. The device of claim 1 wherein yieldable spring means are provided for insuring said edge alignment.

3. The device of claim 1 wherein yieldable spring means are provided for insuring said edge alignment at said exterior position.

4. The device of claim 1 wherein said means are provided for mounting said superimposed mold plates for movement relative to each other to project said edge of one opening rearwardly of the edge of the other opening in said filling position and to align said mold plate openings prior to said exterior position.

5. The device of claim 4 wherein said mold plates are provided with lost motion connecting means for continuing movement of one said plate after said other plate has been stopped to define a portion of said supply passage and wherein said second plate is held motionless during forward motion until the said edges are aligned to comprise the mold opening.

6. The device of claim 5 wherein yieldable spring means are provided for insuring said edge alignment.

7. The device of claim 1 wherein said mold comprises a pair of said superimposed plates having cooperating openings defined by peripheral edges defining said mold opening, and there are provided means for moving said plates relative to each other to a cooperating and coinciding position for determining said mold opening and to a retracted position of the openings and edges of one plate relative to each other to define a part of said supply passage.

8. The device of claim 7 wherein said plates, when said one plate is retracted, define a said passage exit by the space between said bottom plate and the adjacent opening in said top plate.

9. The device of claim 1 wherein said means are provided for mounting said superimposed mold plates for movement relative to each other to project said edge of one opening rearwardly of the edge of the other opening in said filling position and to align said mold plate openings prior to said exterior position, said mold comprising a pair of said superimposed plates having cooperating openings defined by peripheral edges defining said mold opening, and there are provided means for moving said plates relative to each other to a cooperating and coinciding position for determining said mold opening and to a retracted position of the openings and edges of one plate relative to the other to define said supply passage.

10. The device of claim 9 wherein yieldable spring means are provided for insuring said edge alignment at said exterior position.

11. The device of claim 9 wherein said mold plates are provided with lost motion connecting means for continuing movement of one said plate after said other plate has been stopped to define a portion of said supply passage and wherein said second plate is held motionless during forward motion until the said edges are aligned to comprise the mold opening.

12. The device of claim 9 wherein said plates, when said one plate is retracted, define a said passage exit by the space between said bottom plate and the adjacent opening in said top plate.

* * * * *